Jan. 5, 1937.   M. M. MORACK   2,066,995
PARALLEL INVERTER SYSTEM
Filed March 12, 1936
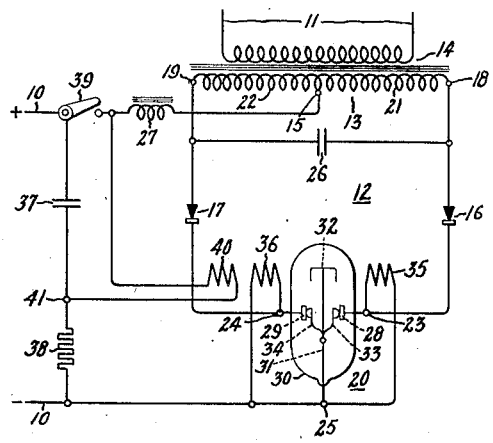
Inventor:
Marvin M. Morack,
by Harry E. Dunham
His Attorney.

Patented Jan. 5, 1937

2,066,995

UNITED STATES PATENT OFFICE 2,066,995

PARALLEL INVERTER SYSTEM

Marvin M. Morack, Schenectady, N. Y., assignor to General Electric Company, a corporation of New York Application March 12, 1936, Serial No. 68,479

5 Claims. (Cl. 175—365)

My invention relates to electric current conversion devices such as inverters, particularly to means comprising mechanically operated switch means for commutating parallel inverters and to means for starting parallel inverters of the vibrating reed type.

It has been proposed heretofore to convert, for example, direct current to alternating current by means of a parallel inverter system the essential elements of which comprise an inductance element, such as the primary of a load transformer associated with an alternating current load circuit, connected at a mid tap to one side of a direct current source, a mechanical circuit making and breaking means or switch means to connect the other side of the direct current source alternately to opposite outer terminals of the inductance element, and two condensers connected between the other side of the direct current source and opposite terminals of the circuit making and breaking means for the purpose of preventing arcing as the connections to the two sections or halves of the inductance element were alternately broken. The current making and breaking means or switch means was so arranged that, in operation, the connection to a given one of the outer terminals of the inductive element was broken before connection was made to the other outer terminal of the inductance element. The switch means was ordinarily of the vibrating reed type comprising two fixed contacts coacting with two movable contacts carried by a vibratable element or reed adapted to be actuated by a pair of operating windings connected respectively across the opposite coacting pairs of fixed and movable contacts.

Commutation difficulties have been encountered, however, in the use of current conversion devices or inverters of the above-described type heretofore proposed. In operation of such inverters, the condensers, connected across the switch means to absorb the arc at breaking of the connection to the halves of the inductance, tended to remain charged, after breaking the connection, until the circuit connection was again made, whereupon the condensers were short-circuited by the switch means, and the resulting condenser discharge through the switch means caused damage to the switch elements.

A further difficulty, encountered in connection with the switch means when of the vibrating reed type, resided in the fact that the inverter circuit was not self-starting. When the direct current source was connected to the inverter, direct current flowed through both sections or halves of the inductance element and also through both of the operating windings. Since the operating windings were thus energized simultaneously, the reed element of the switch means remained in the mid position, with both pairs of contacts closed, and the initiation of vibration of the reed element could only be performed by some external means, as by the more or less haphazard setting of the reed into initial vibration by tapping the glass bulb in which the switch mechanism was enclosed.

An object of the invention is therefore to provide, for parallel inverter systems, switch means and circuit connections so arranged that commutation is facilitated to a high degree.

A further object is the provision of a starting circuit arrangement for inverters when of the vibrating reed type whereby the initiation of vibration of the reed element is accomplished automatically, by simple means, upon connection of the inverter apparatus to the direct current source.

In accordance with my present invention the commutation difficulties above set forth are obviated by the provision of a parallel inverter arrangement including a mechanical circuit making and breaking means or mechanical switch means so arranged that the circuit connection to a given section or half of the inductance element remains closed until the connection to the other half of the inductance element is closed, a commutating capacitance means or condenser connected across the inductance element, and a pair of rectifiers connected respectively between the switch means and the outer terminals of the opposite sections or halves of the inductance element to facilitate commutation of the current between these halves or sections and to prevent short-circuiting of the commutating condenser as the connection to a given one of the inductance halves is opened and the connection to the other half is closed.

Further, the starting difficulties hereinabove mentioned in connection with parallel inverters of the vibrating reed type are obviated in accordance with my invention by the provision of an automatic starting means for such inverters comprising a capacitance means adapted to be charged from the direct current source and to be thereafter discharged through a starting winding to initiate vibration of the vibratable reed element upon connection of the direct current source to the inverter apparatus.

My invention will be better understood from the following description when considered in connection with the accompanying drawing and its scope will be set forth in the appended claims.

Referring to the drawing, the single figure thereof is a diagrammatic representation of an electric inverter system in which my invention has been embodied.

In the drawing a direct current supply circuit 10 is adapted to be interconnected with an alternating current load circuit 11 through a parallel inverter apparatus 12 comprising an inductance element 13, which may be the primary of an output transformer 14, connected at a point intermediate its extremities, as mid-point 15, to one side, as the positive side, of the direct current source 10, a pair of rectifiers 16, 17 preferably of the copper oxide type connected respectively to opposite outer terminals 18, 19 of primary 13, a mechanical circuit making and breaking means or switch means 20 adapted to connect the sections or halves 21, 22 of primary 13 alternately to the other side of direct current source 10 through the rectifiers 16, 17 and having terminals 23, 24 connected respectively to the rectifiers 16, 17 and a third terminal 25 connected to the source 10, and a commutating capacitance means or condenser 26 connected across the primary 13. An inductance means or choke coil 27 may be connected in the direct current line to assist in maintaining the direct current input of the system substantially constant.

The mechanical circuit making or breaking means or switch means, indicated generally by the numeral 20, alternately connecting the opposite section or halves of inductance element 13 in circuit with direct current source 10 may be of any suitable type, provided that the arrangement is such that, in operation of the inverter system, the circuit connection between direct current source 10 and the outer terminal of a given section or half, as 21, of the inductance element 13 is held closed until the connection between source 10 and the other section or half of inductive element 13 has been closed, thus insuring that the circuit including a given one of the sections or halves of the inductance element 13 is not broken until connection has been established to the other section, both sections or halves of the inductance element 13, being therefore, in circuit for a predetermined period of time during each commutation period.

When the switch means is of the vibrating reed type as in the embodiment of the invention illustrated in the drawing, a pair of fixed contacts 28, 29 connected respectively to terminals 23, 24 are mounted in an exhausted glass receptacle 30 and a vibrating reed element 31 connected to terminal 25 is provided in the receptacle, the reed element having an armature element 32 and carrying a pair of movable contacts 33, 34 coacting respectively with fixed contacts 28, 29. To actuate the vibrating reed element 31, a pair of operating windings 35, 36 mounted in proximity to armature element 32 are connected respectively across the corresponding pairs of movable and fixed contacts 28, 33 and 29, 34, which as illustrated in the drawing are in normally closed position when the inverter system is not in operation. To initiate the vibration of the reed element 31, a shock excitation means is provided comprising condenser 37 and a high resistance 38 connected in series across the direct current supply line 10 on the line side of a switch 39 for connecting the circuit 10 to the inverter apparatus 12, and an excitation winding 40 mounted in proximity to armature element 32 and connected between a point of the direct current supply line on the inverter side of switch 39 and a point on the connection 41 between condenser 37 and resistance 38.

In the operation in general of an inverter system in accordance with my present invention and regardless of the particular type of mechanical circuit making and breaking means or switch means employed, since the inductance element 13 is connected at its mid point 15 to one side of the direct current source 10 and since the circuit breaking and making means connects the halves 21, 22 of inductance element 13 alternately through rectifiers 16, 17, to the other side of direct current source 10, therefore a symmetrically alternating voltage is obtained between the outer terminals 18, 19 of the inductance element.

Assuming at a given instant that conditions are such at the circuit making and breaking means that the circuit connections are closed between terminals 25 and 23 for example and circuit connections between terminals 25 and 24 are open, then current from the positive side of direct current circuit 10, connected to mid-point 15, flows through the corresponding section 21 of inductance element 13 and through the rectifier 16. At the same time a charging current flows from mid point 15 through the other section 22 into the commutating condenser 26 which is thereby charged with such polarity that end terminal 19 becomes positive with respect to end terminal 18. A short time later the circuit making and breaking means starts to make connection between terminals 25 and 24 but before connection has been broken between terminals 25 and 23. The commutating condenser 26 then tends to be short-circuited during the period when terminals 23 and 24 are connected at the circuit making and breaking means. Short circuiting of condenser 26 does not occur, however, since the condenser discharge current cannot flow in the reverse direction through rectifier 16.

When the circuit making and breaking means, during the period of commutation, from a given section 21 to the other section 22 of the inductance element 13, makes connection from terminal 25 to both of the terminals 23 and 24, as above set forth, direct current source 10 tends to continue to force current through section 21 as well as through section 22 which has just been connected through rectifier 17 and terminals 24 and 25 to the negative side of source 10. But the charge in commutating condenser 26 is of the proper polarity to oppose the continued flow of current from source 10 through section 21 and to assist the flow of current now beginning from source 10 through the opposite section 22. Therefore by the coaction of the circuit making and breaking means, the rectifiers 16, 17, and the commutating condenser 26, the flow of current from either section of inductance 13 is transferred to the opposite section without necessitating the sudden breaking of a large current in the circuit making and breaking means.

In case the circuit making and breaking means is of the vibrating reed type as in the embodiment of the invention, as shown for illustrative purposes in the drawing, in operation of the system, before closing of the starting switch 39 the condenser 37 is in charged condition by reason of its connection, through high resistance 38, across the direct current source 10. Upon closing of starting switch 39 the condenser 37 discharges through excitation winding 40 which, coacting with armature element 32, then sets the vibrating reed member 31 in initial vibration, thereby causing the pairs of movable and fixed contacts 28, 33 and 29, 34 to connect alternately the opposite sections or halves of inductance element 13, through the corresponding rectifiers, across the direct current source 10. After a very short time the condenser 37 is entirely discharged and since the resistance 38 is very high the excitation winding 40 performs no other function until the next time the system is required to be started. Upon initiation of the alternate opening and closing of the pairs of contacts 28, 33 and 29, 34, the short circuits constituted by the closed pairs of contacts are removed alternately from across the operating windings 35, 36 which then receive operating current alternately and continue to actuate the reed element 31 carrying the movable contacts 33, 34.

The vibratable portion of the circuit making and breaking means, including reed 31 and the movable contacts 33, 34 carried thereby, is so arranged that both pairs of contacts 28, 33 and 29, 34 are in closed position as illustrated before starting of the system. Each pair of contacts 28, 33 and 29, 34 during commutation from one section or half of inductance 13 to the other section, remains closed for a short period while the other pair of contacts is closing, there being no time during which the pairs of contacts are open simultaneously. The commutation is accomplished as hereinbefore described, without necessitating the breaking of large currents at the pairs of contacts.

My invention has been described herein in a particular embodiment for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. An electric system comprising a current source, an inductance element having a mid tap connected to said source, a pair of rectifiers connected to opposite outer terminals of said inductance, a mechanical switch means to cause current from said source to flow alternately through said rectifiers and the corresponding opposite portions of said inductance element and so arranged that connection to a given one of said terminals is made before connection to the other terminal is broken, a commutating capacitance means in parallel with said inductance, and a load circuit associated with said inductance.

2. In an electric system, a current source, an inductance element connected at a mid point thereof to said source, a pair of copper oxide rectifiers connected to opposite terminals of said inductance element, means comprising a mechanical switch to conduct current from said source alternantly through said rectifiers and the corresponding portions of said inductance element and so arranged that connection to a given one of said terminals is made before connection to the other terminal is broken, a commutating condenser connected across said terminals, and a load circuit associated with said inductance element.

3. An electric system comprising a current source, an inductance element connected at a mid point thereof to a terminal of said source, a pair of rectifiers connected to opposite outer terminals of said element, a mechanical switch means to connect said source alternately to said opposite outer terminals through the corresponding rectifiers, said switch means being so arranged that connection to a given one of said outer terminals is made before connection to the other of said outer terminals is broken, a commutating capacitance means in parallel with said inductance means, and a load circuit associated with said inductance element.

4. An electric system comprising a current source, an inductance element connected at a mid point thereof to a terminal of said source, a pair of rectifiers connected to opposite outer terminals of said element, a vibrating switch having two pairs of contacts to connect said source alternately to said outer terminals of said source through the corresponding rectifiers, said switch being so arranged that a given one of said pairs of contacts is closed before the other of said pairs of contacts is opened, a commutating condenser in parallel with said inductance element, and a load circuit associated with said element.

5. In an electric system comprising a current source, an inductance element connected at a mid point thereof to one terminal of said source, a switch having a vibratable element and two pairs of contacts to connect opposite outer terminals of said inductance element to another terminal of said source, and means including a pair of operating coils connected respectively across said pairs of contacts to vibrate said vibratable element, means to initiate the vibration of said vibratable element said last named means including a condenser and a resistor connected in series across said current source, a starting winding in operative relation with said vibratable element, and a switch means operable to connect said condenser to be charged from said source and thereafter to be discharged through said starting winding.

MARVIN M. MORACK.